(12) United States Patent
Fernandez et al.

(10) Patent No.: US 12,397,906 B2
(45) Date of Patent: Aug. 26, 2025

(54) DEVICE FOR DRIVING AT LEAST ONE WHEEL OF AN AIRCRAFT LANDING GEAR

(71) Applicant: SAFRAN TRANSMISSION SYSTEMS, Colombes (FR)

(72) Inventors: Maxime Fernandez, Moissy-Cramayel (FR); Yohan Douy, Moissy-Cramayel (FR); Loïc Francois, Moissy-Cramayel (FR); Boris Pierre Marcel Morelli, Moissy-Cramayel (FR); Jordane Emile André Peltier, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 18/467,019

(22) Filed: Sep. 14, 2023

(65) Prior Publication Data
US 2024/0092480 A1    Mar. 21, 2024

(30) Foreign Application Priority Data

Sep. 16, 2022  (FR) .................................. FR2209343

(51) Int. Cl.
*B64C 25/32* (2006.01)
*F16H 1/28* (2006.01)
F16H 57/08 (2006.01)

(52) U.S. Cl.
CPC ............ *B64C 25/405* (2013.01); *F16H 1/28* (2013.01); *F16H 2001/2881* (2013.01); *F16H 2057/085* (2013.01)

(58) Field of Classification Search
CPC . B64C 25/405; F16H 1/28; F16H 2001/2881; F16H 2001/2872; B60K 7/0007; B60K 17/046

(Continued)

(56) References Cited

U.S. PATENT DOCUMENTS 2,401,875 A * 6/1946 Lawler ...................... F16H 1/46
                                                    475/342
3,421,596 A * 1/1969 Livezey .................. F16H 47/08
                                                    180/65.245

(Continued)

FOREIGN PATENT DOCUMENTS

FR          3116095 A1    11/2010
WO     2016202909 A1    12/2016

OTHER PUBLICATIONS

French Search Report mailed Apr. 18, 2023 issued in corresponding French Application No. FR2209343, filed Sep. 16, 2022, 2 pages total.

*Primary Examiner* — Sherry L Estremsky
(74) *Attorney, Agent, or Firm* — CHRISTENSEN O'CONNOR JOHNSON KINDNESS PLLC

(57) ABSTRACT

A device for driving at least one wheel of an aircraft landing gear is provided. The device includes at least one wheel having a rim, an electric motor having a shaft, and a mechanical transmission system for mechanical transmission between the shaft of the motor and the rim. The mechanical transmission system includes a mechanical reduction gear. The mechanical reduction gear includes a sun gear secured in rotation to the shaft and having an external toothing, a stationary ring gear with internal toothing, a movable ring gear secured in rotation to the rim and having an internal toothing, and planet gears that are meshed with the sun gear and each have two external toothing meshed respectively with the toothing of the stationary and movable ring gears.

12 Claims, 14 Drawing Sheets

(58) Field of Classification Search
USPC .......................................................... 475/342
See application file for complete search history.

(56) References Cited

U.S. PATENT DOCUMENTS

| | | | | |
|---|---|---|---|---|
| 3,686,978 A * | 8/1972 | Knoblach | ............... | F16H 3/001 |
| | | | | 475/296 |
| 3,711,043 A * | 1/1973 | Cameron-Johnson | ....................... | |
| | | | | B64C 25/405 |
| | | | | 244/50 |
| 4,280,376 A * | 7/1981 | Rosen | ..................... | F16H 55/08 |
| | | | | 74/462 |
| 5,957,804 A * | 9/1999 | Schulz | ..................... | F16H 1/46 |
| | | | | 475/342 |
| 8,342,612 B2 * | 1/2013 | Sgherri | ................ | B60K 17/046 |
| | | | | 301/6.5 |
| 8,714,481 B2 * | 5/2014 | Sweet | ................... | B64C 25/405 |
| | | | | 244/100 R |
| 9,650,131 B2 * | 5/2017 | Jaber | ..................... | B60B 25/004 |
| 11,235,661 B1 * | 2/2022 | Bonny | ................. | F16H 57/082 |
| 2003/0139250 A1 * | 7/2003 | Bowman | ............. | B60K 17/046 |
| | | | | 475/342 |
| 2014/0041619 A1 * | 2/2014 | Yamauchi | ........... | F16H 57/0486 |
| | | | | 123/196 R |
| 2018/0170527 A1 | 6/2018 | Roques et al. | | |
| 2019/0291575 A1 | 9/2019 | Rotenberg | | |
| 2022/0145769 A1 | 5/2022 | Mouly et al. | | |

\* cited by examiner

DEVICE FOR DRIVING AT LEAST ONE WHEEL OF AN AIRCRAFT LANDING GEAR

CROSS-REFERENCE(S) TO RELATED APPLICATION(S)

This application claims priority to FR2209343, filed Sep. 16, 2022, the disclosure of which is hereby expressly incorporated by reference herein in its entirety.

TECHNICAL FIELD

The present disclosure relates to a device for driving at least one wheel of an aircraft landing gear.

BACKGROUND

The technical background includes the documents US-A1-2019/291575, WO-A1-2016/202909 and FR-A1-3 116 095.

An aircraft has landing gear equipped with wheels for moving the aircraft on the ground over a tarmac. This taxiing can be achieved by propelling the aircraft using its turbomachines.

To limit the fuel consumption and the environmental impact, it is known to carry out this taxiing electrically. The electric taxiing is achieved by driving the wheels of a landing gear by an electric motor.

The present application proposes an improvement on existing technologies and thus relates to an electric motor device for driving at least one wheel of an aircraft landing gear.

A solution consisting of using a reduction gear to transmit the power of an electric motor to a wheel of a landing gear was proposed by the Applicant in the document EP-A1-3 882 136.

The role of a mechanical reduction gear is to modify the speed and torque ratio between the input axle and the output axle of a mechanical system.

In the remote field of the aircraft turbomachines, a mechanical reduction gear is used to transmit power between two rotating mechanical shafts.

There are many different types of reduction gears, for example differential, planetary, epicyclic, with intermediate lines, with reduction stages in series, etc.

In the prior art of the dual-flow turbomachines, the reduction gears are of the planetary or epicyclic type. Such a reduction gear comprises a central pinion, referred to as sun gear, a ring gear and pinions referred to as planet gears, which are engaged between the sun gear and the ring gear. The planet gears are maintained by a frame referred to as planet carrier. The sun gear, the ring gear and the planet carrier are planetary because their axes of revolution coincide with the longitudinal axis of the turbomachine. The planet gears each have a different axis of revolution equally distributed on the same operating diameter around the axis of the planetaries. These axes are parallel to the longitudinal axis of the turbomachine.

There are several reduction gear architectures. In other similar applications, there are architectures referred to as differential or "compound."

In a planetary reduction gear, the planet carrier is stationary and the ring gear is the output shaft of the device which rotates in the opposite orientation of the sun gear.

In an epicyclic reduction gear, the ring gear is stationary and the planet carrier is the output shaft of the device which rotates in the same orientation as the sun gear.

On a compound reduction gear, no element is attached in rotation. The ring gear rotates in the opposite orientation of the sun gear and the planet carrier.

The reduction gears can consist of one or more meshing stages. This meshing is ensured in different ways such as by contact, friction or magnetic field.

In the present application, "stage" or "toothing" means at least one series of meshing teeth with at least one series of complementary teeth. A toothing can be internal or external.

A planet gear may comprise one or two meshing stages. A single-stage planet gear comprises a toothing that can be straight, helical or herringbone, and teeth of which are located on a same diameter. This toothing cooperates with both the sun gear and the ring gear.

A double-stage planet gear comprises two toothings that are located on different diameters. A first toothing cooperates with the sun gear and a second toothing generally cooperates with the ring gear.

A reduction gear with a meshing double stage has the advantage of having a higher reduction ratio than a reduction gear with a single meshing stage of the same overall dimensions.

In the context of a device for driving at least one wheel of a landing gear, the use of an electric motor and a reduction gear to drive the wheel generates considerable overall dimensions constraints. The outer diameter of the reduction gear is limited by the size of the rim of the wheel, and the inner diameter of the reduction gear is strongly constrained by the diameter of the hub of the wheel. In addition, the use of an electric motor generally rotating at high speeds requires the use of a reduction gear with a high reduction ratio in order to offer an output speed that corresponds to the low speed of rotation of the wheel. The current epicyclic and planetary gear trains do not offer these levels of reduction in such a small space.

The disclosure proposes a solution to at least part of these problems, which is simple, effective, and economical.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Embodiments of the present disclosure relate to a device for driving at least one wheel of an aircraft landing gear. In some embodiments, the device includes:

at least one landing gear wheel, this wheel comprising a rim having an axis of rotation,
an electric motor comprising a shaft,
a mechanical transmission system between the shaft of the motor and the rim, this mechanical transmission system comprising a mechanical reduction gear,
wherein the mechanical reduction gear comprises:
a sun gear secured in rotation to the shaft of the motor, this sun gear being centered on the axis and comprising an external toothing,
a stationary ring gear centered on the axis and that comprises an internal toothing, this stationary ring gear being configured to be secured to a stator of the device,
a movable ring gear centered on the axle and that comprises an internal toothing, this movable ring gear being secured in rotation with the rim, and
planet gears that are meshed with the sun gear, the planet gears being carried by a planet carrier mobile in rotation around the axis, each of the planet gears comprising two external toothings meshed respectively with the toothings of the stationary and movable ring gears.

Embodiments of the present disclosure include a driving device for at least one wheel of an aircraft landing gear, which is equipped with a reduction gear with two independent ring gears and different functions. One of the ring gears is stationary and the other of the ring gears is mobile in rotation. It is therefore understood that the movable ring gear forms an output (torque) of the reduction gear, the input of the reduction gear being formed by the sun gear. The planet carrier is also mobile in rotation. It can rotate freely and is therefore independent of any rotor of the electric motor.

Embodiments of the present disclosure are compatible with a multi-stage reduction gear as described above. They are also compatible with a reduction gear in which the planet carrier is mobile in rotation, such as the epicyclic or differential reduction gear. They are also compatible with any type of toothings (straight, helical, herringbone, etc.). Some embodiments are further compatible with a planet carrier of the monobloc type or of the cage and cage carrier type. These different types of reduction gear are well known to a person skilled in the relevant art. The solution proposed below is compatible with any type of planet gear bearing, whether it consists of rolling elements, a hydrodynamic bearing, etc.

The device according to the present disclosure may include one or more of the following characteristics, taken alone or in combination with each other:
- each of the planet gears is meshed by a first toothing with the toothing of the sun gear and the toothing of the stationary ring gear, and by a second toothing with the toothing of the movable ring gear;
- each of the planet gears is meshed by a first toothing with the toothing of the sun gear and the toothing of the movable ring gear, and by a second toothing with the toothing of the stationary ring gear;
- the planet gears are each centered and guided by two roller bearings carried by the planet carrier, the toothing of each of the planet gears being located between these roller bearings;
- the planet gears are each centered and guided by two needle bearings carried by the planet carrier, each of the needle bearings being radially aligned with one of the toothing of the planet gear;
- the sun gear is coupled to a shaft or secured to a shaft, the planet gears are arranged around at least part of this shaft or of the shaft of the motor;
- the toothing of the stationary and movable ring gears have the same diameter;
- the toothing of the stationary and movable ring gears have different numbers of teeth;
- all the toothings are selected from straight, helical or herringbone toothing;
- the motor has an annular shape centered on the axis and is arranged next to the reduction gear;
- the motor is arranged adjacent to and radially opposite the axis of rotation at the level of the planet gears;
- the toothing of each of the planet gears have different diameters, the smallest diameter toothing of each of the planet gears meshing with the toothing of the movable ring gear, and the smallest diameter toothing of each of the planet gears meshing with the toothing of the stationary ring gear;
- the electric motor is arranged on the side of the stationary ring gear and on the opposite side to the movable ring gear; and
- the planet carrier is arranged on the electric motor side.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed.

Figure 1:
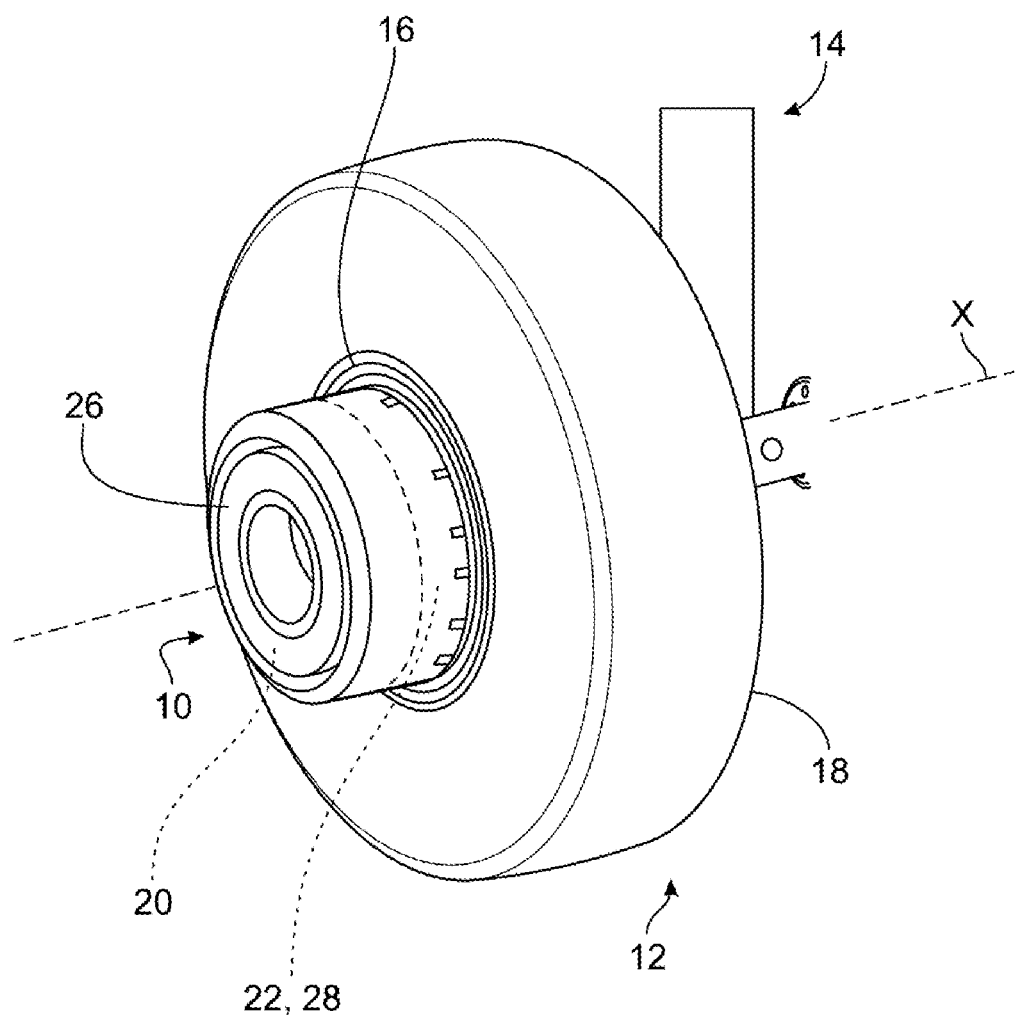
FIG. 1 is a schematic perspective view of a wheel of an aircraft landing gear and a device for driving this wheel in accordance with embodiments of the present disclosure.

FIG. 1 shows a device 10 for driving at least one wheel 12 of an aircraft landing gear 14.

The wheel 12 comprises a rim 16 with an axis of rotation X. Conventionally, this rim 16 is generally tubular or disc-shaped and carries a tyre 18 on its periphery.

The device 10 comprises an electric motor 20 and a mechanical transmission system 22 for a mechanical transmission between a shaft of the motor 20 and the rim 16 of the wheel 12.

In the illustrated embodiment, the motor 20 and the system 22 each have a generally annular shape and are centered on the axis X. They are arranged next to each other and the system 22 is installed between the motor 20 and the rim 16. A part of the system 22, or even part of the motor 20, could be housed in the rim 16 to optimize the overall dimensions of the device 10. The motor 20 and the system 22 can be protected by an outer cylindrical cover 26 projecting from one side of the rim 16 or of the tire 18.

The mechanical transmission system 22 comprises a mechanical reduction gear 28, with examples of these embodiments shown in FIGS. 2-5.

Figure 2:
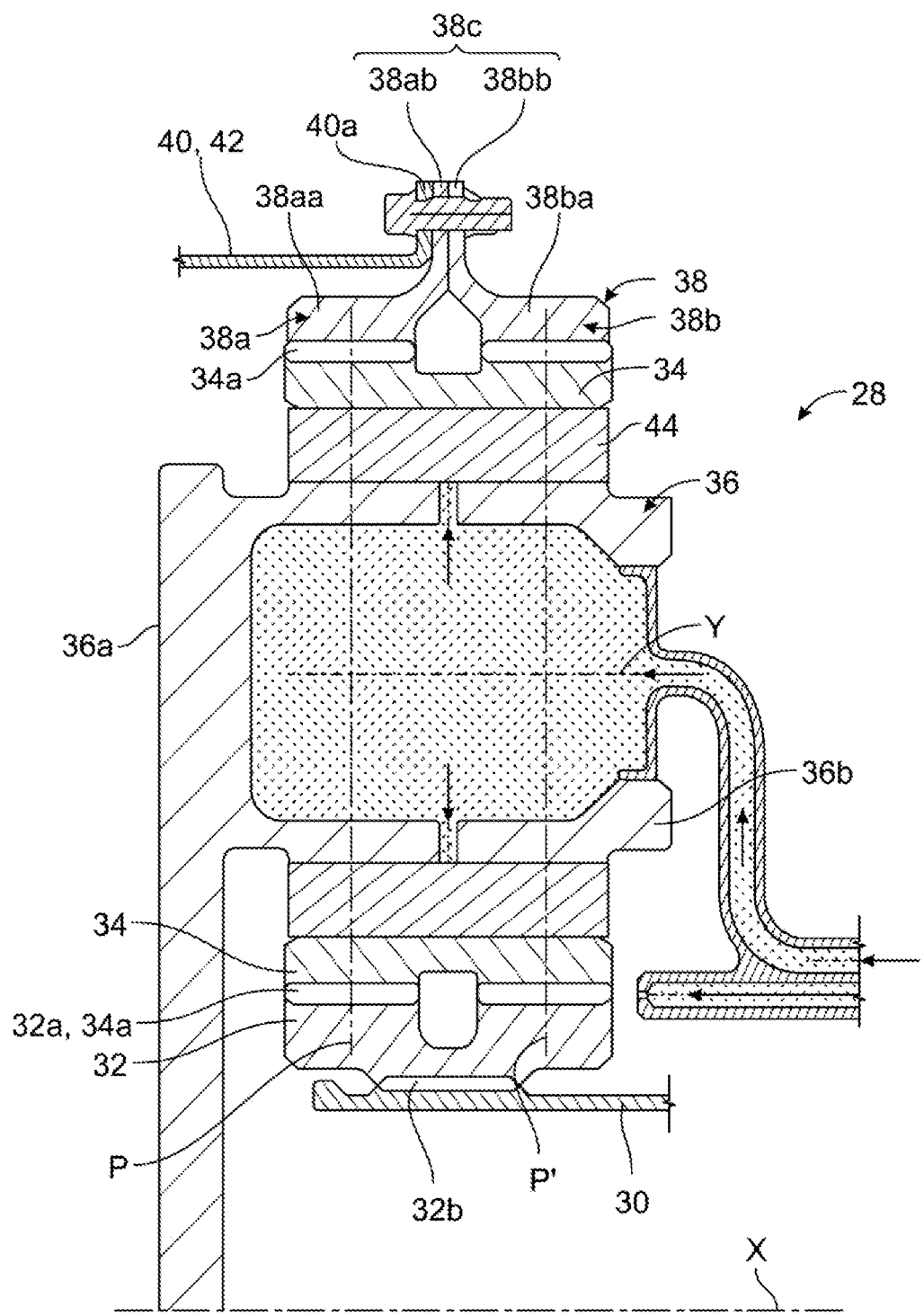
FIG. 2 is a partial axial sectional view of a mechanical reduction gear in accordance with embodiments of the present disclosure.

FIG. 2 shows an epicyclic reduction gear 28. At the input, the reduction gear 28 is connected to a shaft 30, for example by means of internal splines 32a. The shaft 30 drives a planetary pinion referred to as the sun gear 32. In some embodiments, the sun gear 32 drives a series of pinions referred to as planet gears 34, which are equally spaced on the same diameter around the axis X of rotation of the sun gear 32. This diameter is equal to twice the operating center distance between the sun gear 32 and the planet gears 34. The number of planet gears 34 is generally defined as between three and seven.

The assembly of the planet gears 34 is held by a frame referred to as planet carrier 36. Each planet gear 34 rotates about its own axis Y and meshes with a ring gear 38.

In the output we have:
(1) In this epicyclic configuration, the assembly of the planet gears 34 drive in rotation the planet carrier 36 about the axis X. The ring gear 38 is attached to a stator via a ring gear carrier 40 and the planet carrier 36 is attached to another shaft 42.
(2) In another planetary configuration, the assembly of the planet gears 34 is held by a planet carrier 36 which is attached to a stator. Each planet gear drives the ring gear 38 which is connected to the shaft 42 via a ring gear carrier 40.
(3) In another differential configuration, the assembly of the planet gears 34 is held by a planet carrier 36 which is connected to the shaft 30. Each planet gear 34 drives the ring gear 38 which is fitted to the shaft 42 via a ring gear carrier 40.

Each planet gear 34 is mounted free in rotation by means of a bearing 44, for example of the rolling or hydrodynamic bearing type. Each bearing 44 is mounted on one of the axles 36b of the planet carrier 36 and all the axles 36b are positioned relative to each other using one or more structural frames 36a of the planet carrier 36. The number of axles 36b and bearings 44 is equal to the number of planet gears 34. For reasons of operation, assembly, manufacture, inspection, repair or replacement, the axles 36b and the frame 36a may be separated into several parts.

For the same reasons mentioned above, the toothing 34a of a planet gear 34 can be separated into several helices or teeth each having a median plane P, P'. In the example shown, each planet gear 34 comprises two series of herringbone teeth cooperating with a ring gear 38 separated into two half-ring gears:
(1) An upstream annulus 38a consisting of a rim 38aa and an attachment half-flange 38ab. On the rim 38aa is the front helix meshed with a helix of the toothing 34a of each planet gear 34. The helix of the toothing 34a also meshes with that of the sun gear 32.
(2) A downstream annulus 38b consisting of a rim 38ba and an attachment half-flange 38bb. The rear helix is located on the rim 38ba and is meshed with a helix of the toothing 34a of each planet gear 34. The helix of the toothing 34a also meshes with that of the sun gear 32.

If the helix widths vary between the sun gear 32, the planet gears 34 and the ring gear 38 because of the toothing overlaps, they are all centered on a median plane P for the upstream teeth and on another median plane P' for the downstream teeth.

FIG. 2 illustrates the case of a reduction gear with a single meshing stage, i.e., the same toothing 34a of each planet gear 34 cooperates with both the sun gear 32 and the ring gear 38. Although the toothing 34a comprises two sets of teeth, these teeth have the same average diameter and form a single toothing referred to as herringbone.

The attachment half-flange 38ab of the upstream annulus 38a and the attachment half-flange 38bb of the downstream annulus 38b form the attachment flange 38c of the ring gear. The ring gear 38 is attached to the ring gear carrier 40 by assembling the attachment flange 38c of the ring gear 38 and an attachment flange 40a of the ring gear carrier 40 using a bolted assembly, for example.

Figure 3:
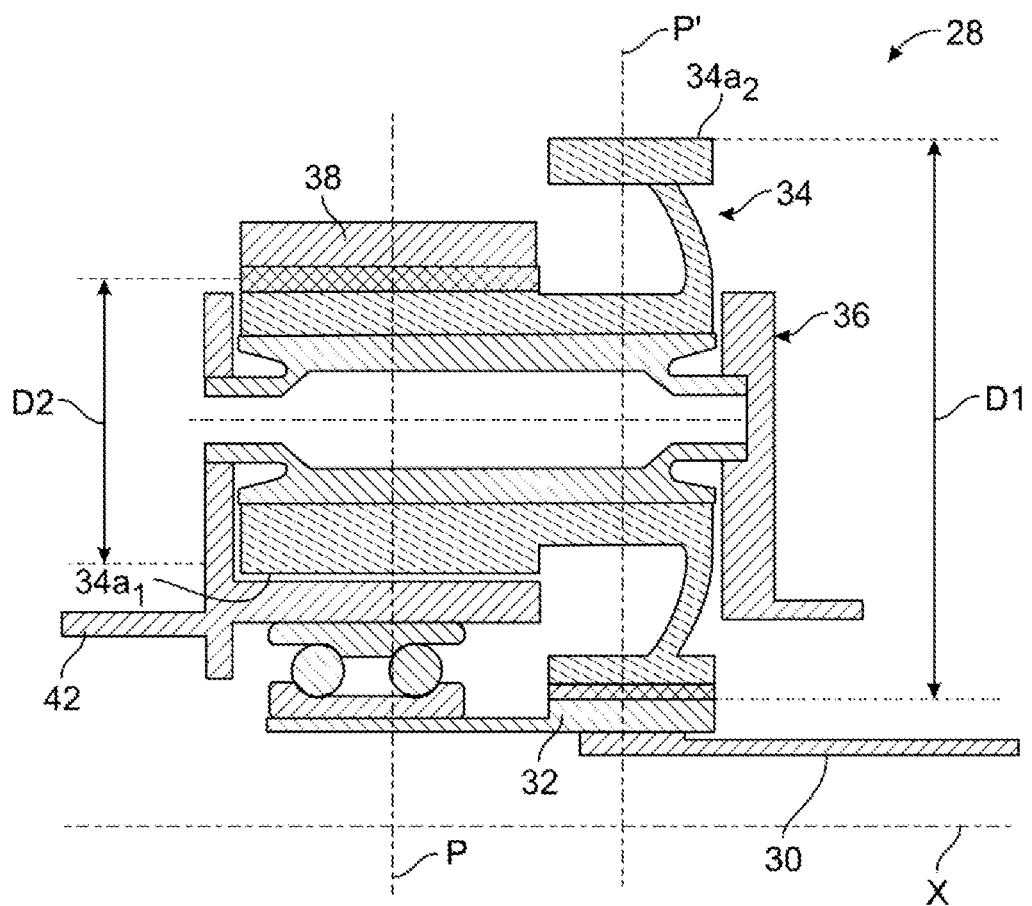
FIG. 3 is another partial axial sectional view of a mechanical reduction gear in accordance with embodiments of the present disclosure.

FIG. 3 shows another example of reduction gear architecture, referred to as a double meshing stage, in which each planet gear 34 comprises two separate toothings 34a1, 34a2 configured to cooperate respectively with the ring gear 38 and the sun gear 32.

In this FIG. 3, the elements already described in the foregoing are designated by the same references.

The toothing 34a1 meshing with the ring gear 38 has an average diameter D2 and is located in a median plane P. The toothing 34a2 meshing with the sun gear 32 has an average diameter D1 and is located in another median plane P'. The median planes P, P' are parallel to each other and perpendicular to the axis X. The diameter D2 is smaller than the diameter D1. Finally, each toothing 34a1, 34a2 comprises a single helix.

Figure 4:
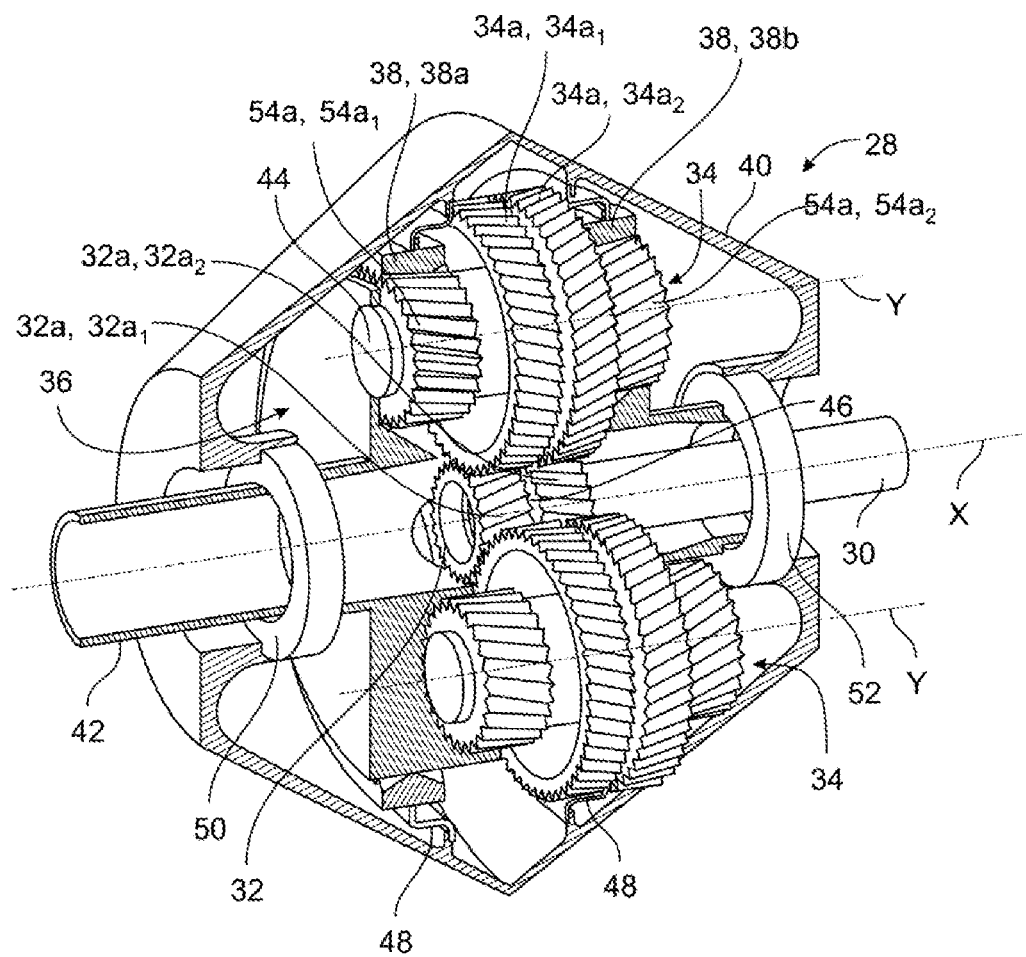
FIG. 4 is a schematic axial section and perspective view of a reduction gear with a double symmetrical meshing stage in accordance with embodiments of the present disclosure.
Figure 5:
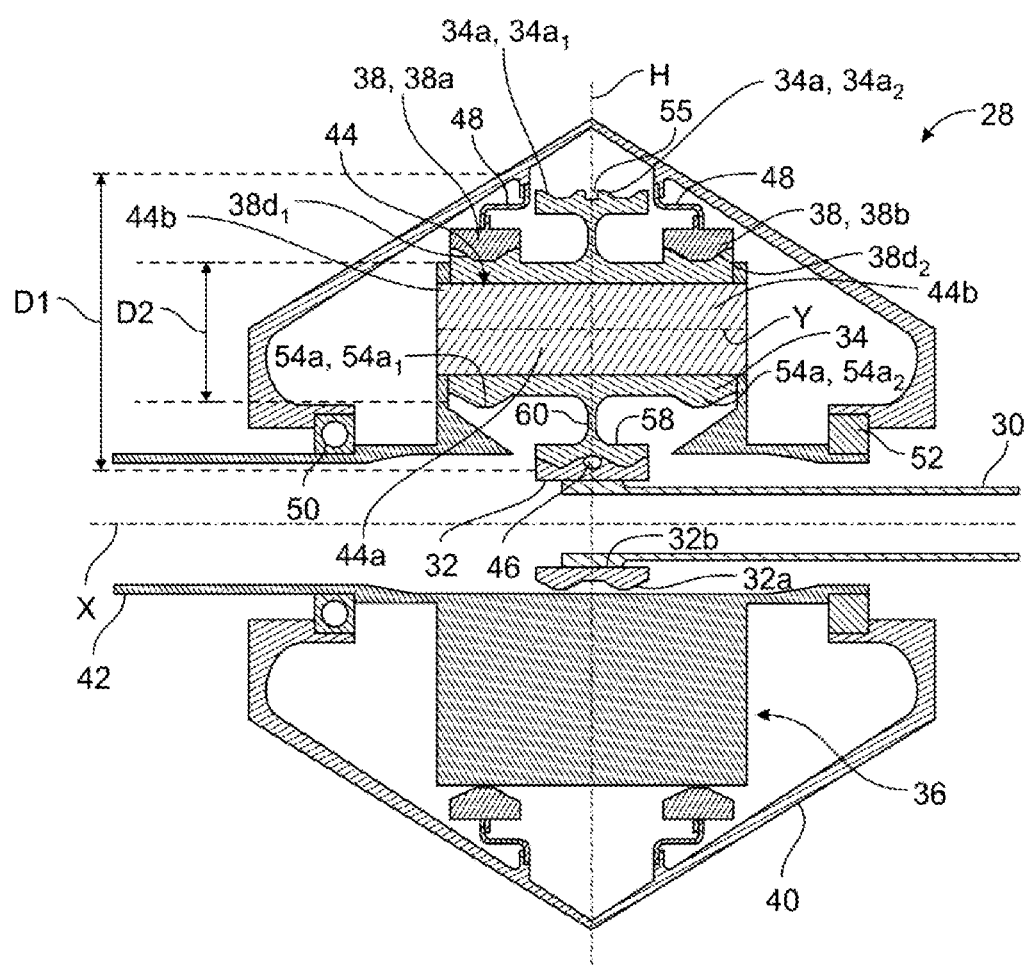
FIG. 5 is another schematic axial section view of the reduction gear of FIG. 4.

FIGS. 4 and 5 show a reduction gear 28 with symmetrical double toothing, comprising:
a sun gear 32 having an axis of rotation X;
a ring gear 38 which extends around the sun gear 32 and which is configured so that it cannot rotate about the axis X; and
planet gears 34 which are meshed with the sun gear 32 and the ring gear 38 and which are maintained by a planet carrier 36 which is configured to be mobile in rotation about the axis X.

The plane H is defined as a median plane perpendicular to the axis X and passing substantially through the middle of the reduction gear 28 (see FIG. 5).

The sun gear 32 comprises internal splines 32b for coupling with the shaft 30 and external toothing 32a for meshing with the planet gears 34. The toothing 32a has two series of adjacent chevron-shaped teeth, separated from each other by an annular groove 46 oriented outwards. The toothing 32a is symmetrical with respect to the plane H, its teeth being located on either side of the plane H which passes through the groove 46.

The ring gear 38 is formed by two independent annulus 38a, 38b and comprises a toothing separated into two series of chevron-shaped teeth 38d1, 38d2 carried respectively by the two annuluses.

The annulus 38a, 38b are arranged symmetrically with respect to the plane H, which therefore extends between these annuluses. The annuluses 38a, 38b are connected and secured to a ring gear carrier 40 by means of annular connecting flasks 48. The flasks 48 are independent of each other, each flask having a general S-shape in axial half-section providing it with a certain radial flexibility by elastic deformation during operation.

Each annulus 38a, 38b extends around the axis X and is secured to the corresponding flask 48 by its external periphery. Its inner periphery comprises one of the teeth 38d1, 38d2.

The ring gear carrier 40 has a generally annular shape about the axis X and more particularly is biconical. It thus comprises a first upstream or left-hand segment in the drawing, with an upstream end of smaller diameter, and a downstream end of larger diameter which is connected to the upstream end of larger diameter of the other, downstream or right-hand segment in the drawing. The larger diameter ends of the segments are therefore connected together, and their smaller diameter ends form the axial ends of the ring gear carrier 40.

The upstream end of the ring gear carrier 40 extends around the planet carrier 36 or a shaft 42 connected to this planet carrier, and is centered and guided in rotation on the planet carrier or shaft via at least one bearing 50. Similarly, the downstream end of the ring gear carrier 40 extends around the planet carrier 36 or a shaft connected to this planet carrier, and is centered and guided in rotation on the planet carrier or the shaft by means of at least one further bearing 52.

As with the ring gear 38, the ring gear carrier 40 is symmetrical with respect to the plane H which cuts the ring gear carrier 40 in the middle and therefore passes through the ends of the aforementioned segments with the largest diameter.

Each planet gear 34 comprises a first toothing 34a of mean diameter D1 for meshing with the sun gear 32, and a second toothing 54aa of mean diameter D2, different from D1 and in particular smaller than D1, for meshing with the ring gear 38. The average diameters are measured from the axis Y of each planet gear 34 and represent the average between the maximum diameter and the minimum diameter of a toothing of this planet gear.

Each planet gear 34 comprises a cylindrical sleeve 58 and an annular web 60 extending substantially radially outwards from the middle of this sleeve 58. The toothing 54aa is separated into two series of chevron-shaped teeth 54a1, 54a2 which are located respectively on the axial ends of the sleeve 58. The toothing 34aa comprise two series of chevron-shaped teeth 34a1, 34a2 which are located at the external periphery of the web 60 and which are separated from each other by an annular groove 55 opening radially outwards with respect to the axis Y.

The toothing 34aa is crossed at its center by the plane H which passes through the groove 55, the teeth 34a1, 34a2 therefore being arranged on either side of the plane H. The teeth 54a1, 54a2 are also arranged symmetrically with respect to the plane H.

The toothing 34aa and the external periphery of the web 60 have an axial dimension which is smaller than the axial distance between the annulus 38a, 38b and between the flasks 48, so that each planet gear 34 can rotate freely in the ring gear carrier 40 and between the annulus 38a, 38b and the flasks 48.

Each of the planet gears 34 is guided in rotation by a hydrodynamic bearing 44 which comprises a cylindrical body 44a which passes through the planet gear 34, and in particular its sleeve 58, and which is configured to form a film of guiding oil inside the planet gear.

The body 44a of a bearing 44 extends along the axis Y and comprises at its longitudinal ends extensions 44b housed in orifices forming seats in the planet carrier 36.

The body 44a is generally tubular and comprises an internal bore of oil circulation which generally communicates with oil supply conduits to an external cylindrical surface of the body for the formation of the oil film between this surface and an internal cylindrical surface of the planet gear 34.

Embodiments of the present disclosure can increase the reduction ratio of a mechanical reduction gear in the context of a device 10 for driving at least one wheel of an aircraft landing gear, as illustrated in FIG. 1.

The reduction gear 28 of the device 10 according to embodiments of the present disclosure comprises all the characteristics described above in relation to FIGS. 3, 4, and 5 insofar as they are not contrary to or do not contradict what follows.

Figure 6:
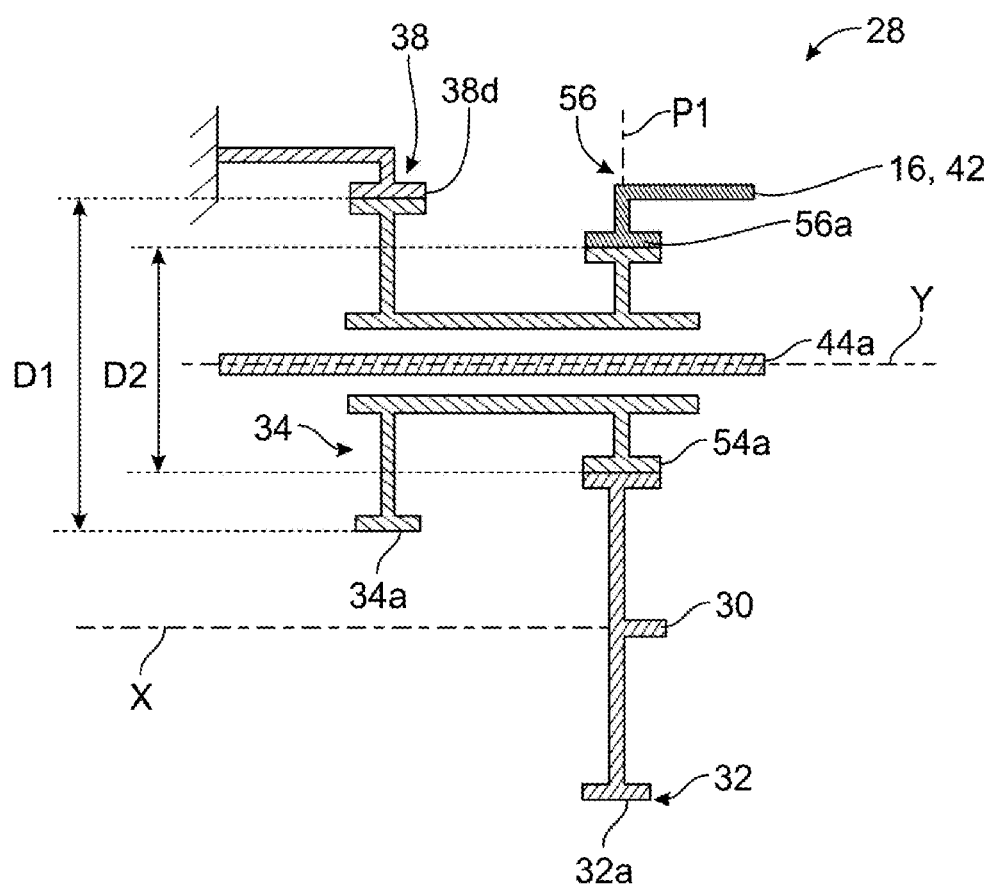
FIG. 6 is a schematic partial view in axial section of a reduction gear for a device in accordance with embodiments of the present disclosure.

The references used in FIG. 6 and following and already used in FIGS. 3, 4, and 5 therefore designate identical or similar elements.

Figure 7:
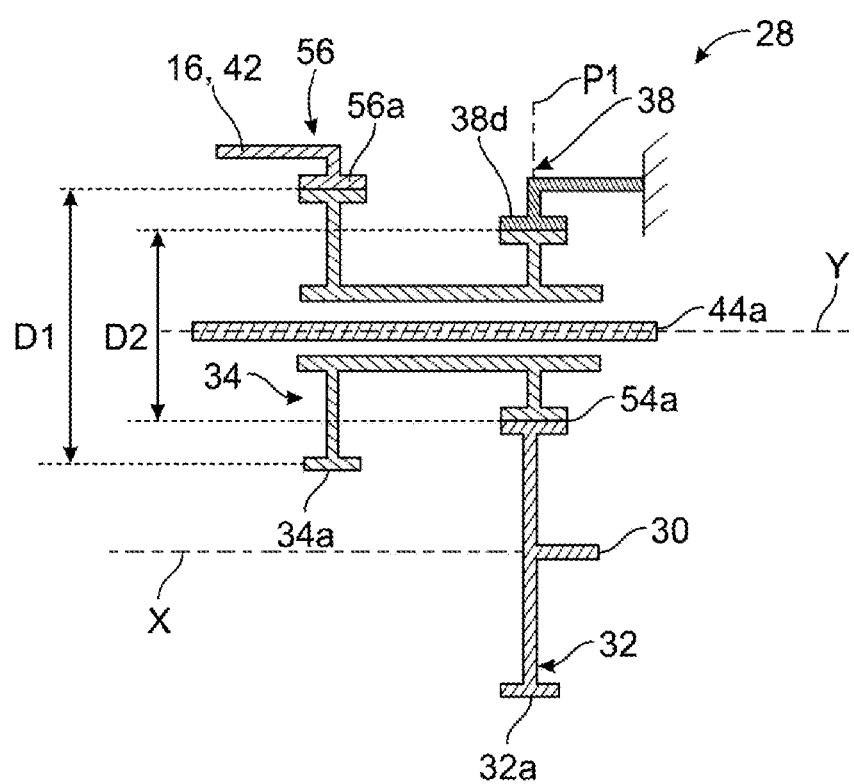
FIG. 7 is a schematic partial view in axial section of a reduction gear for a device in accordance with other embodiments of the present disclosure.
Figure 8:
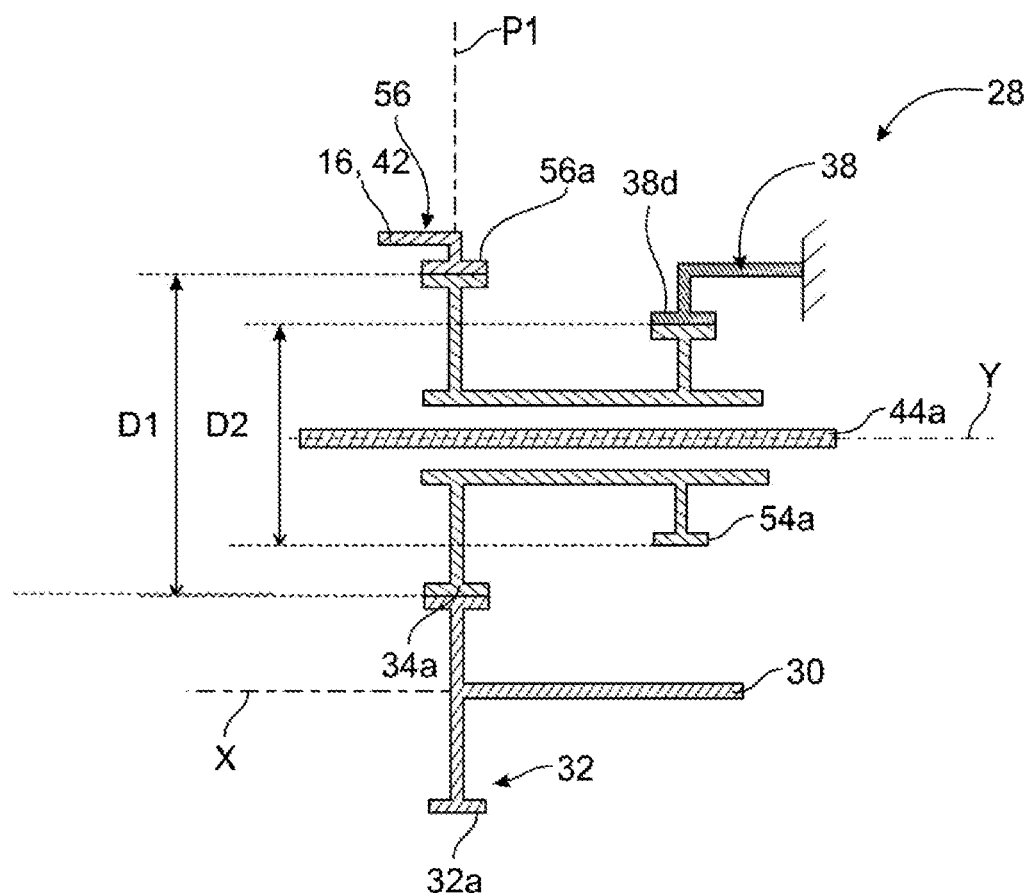
FIG. 8 is a schematic partial view in axial section of a reduction gear for a device in accordance with further embodiments of the present disclosure.

FIGS. 6 to 8 illustrate embodiments of a reduction gear 28 according to the present disclosure, which comprises:
 a sun gear 32 which is mobile in rotation about the axis X and comprises an external toothing 32a;
 a stationary ring gear 38 which extends around the axis X and which comprises an internal toothing 38d, this stationary ring gear being con to be secured to a stator of the device 10;
 a movable ring gear 56 which extends around the axis X and which comprises an internal toothing 56a, this movable ring gear 56 being independent of the stationary ring gear 38; and
 planet gears 34 which are meshed with the sun gear 32 and the ring gears 38 and 56, the planet gears being carried by a planet carrier (not shown) which is mobile in rotation about the axis X.

In the context of the present disclosure, the sun gear 32 is coupled to the shaft 30 of the electric motor 20. The movable ring gear 56 is coupled to the shaft 42 of the rim or to the rim 16 directly.

Each of the planet gears 34 is meshed with the sun gear 32 and the ring gears 38, 56 and comprises a first external toothing 34a with an average diameter D1, and a second external toothing 54a with an average diameter D2, different from D1. In the example shown, D1 is greater than D2. Alternatively, the toothings 34a and 54a could have equal diameters D1 and D2 and different numbers of teeth, so as to have different modules.

The reference 44a refers to the cylindrical body 44a of the hydrodynamic guide bearing for each planet gear 34, as described above.

In the embodiment shown in FIG. 6, the toothing 54a of diameter D2 of each planet gear 34 is meshed with the toothing 32a of the sun gear 32 and the toothing 56a of the movable ring gear 56. The toothings 32a, 54a and 56a are thus in the same plane P1 perpendicular to the axis X. The toothing 34a of diameter D1 of each planet gear 34 is meshed with the toothing 38d of the stationary ring gear 38.

In the embodiment shown in FIG. 7, the toothing 34a of diameter D1 of each planet gear 34 are meshed with the toothing 56a of the movable ring gear 56. The toothing 54a of diameter D2 of each planet gear 34 is meshed with the toothing 32a of the sun gear 32 and the toothing 38d of the stationary ring gear 38. The toothings 32a, 54a and 38d are thus in the same plane P1 perpendicular to the axis X.

In the embodiment shown in FIG. 8, the toothing 34a of diameter D1 of each planet gear 34 are meshed with the toothing 56a of the movable ring gear 56 and with the toothing 32a of the sun gear 32. The toothings 32a, 34a and 56a are thus in the same plane P1 perpendicular to the axis X. The toothing 54a of diameter D2 of each planet gear 34 is meshed with the toothing 38d of the stationary ring gear 38.

In the embodiments of FIGS. 6 and 8 where the sun gear 32 and the movable ring gear 56 mesh with the same toothing of the planet gears 34, the (torque) output of the reduction gear can be said to be aligned with its input. In the configuration shown in FIG. 7, where the sun gear 32 and the movable ring gear 56 mesh with different toothings of the planet gears 34, the (torque) output of the reduction gear can be said to be opposite to its input.

In some embodiments, the number of teeth on the movable ring gear 56 is different from the number of teeth on the stationary ring gear 38, so that the two ring gears have different diameters. Alternatively, the diameters can be equal, provided that the two ring gears have different moduli. The direction of rotation of the movable ring gear 56 may depend on the relative diameter of the two ring gears 38, 56. For example, when the number of teeth of the movable ring gear 56 is greater than that of the stationary ring gear 38, the reduction gear 28 is contra-rotating, i.e., the movable ring gear 56 rotates in the opposite direction to the sun gear 32. When the number of teeth of the movable ring gear 56 is less than that of the stationary ring gear 38, the reduction gear 28 is co-rotating, i.e., the ring gear 56 and the sun gear 32 rotate in the same direction.

Figure 9:
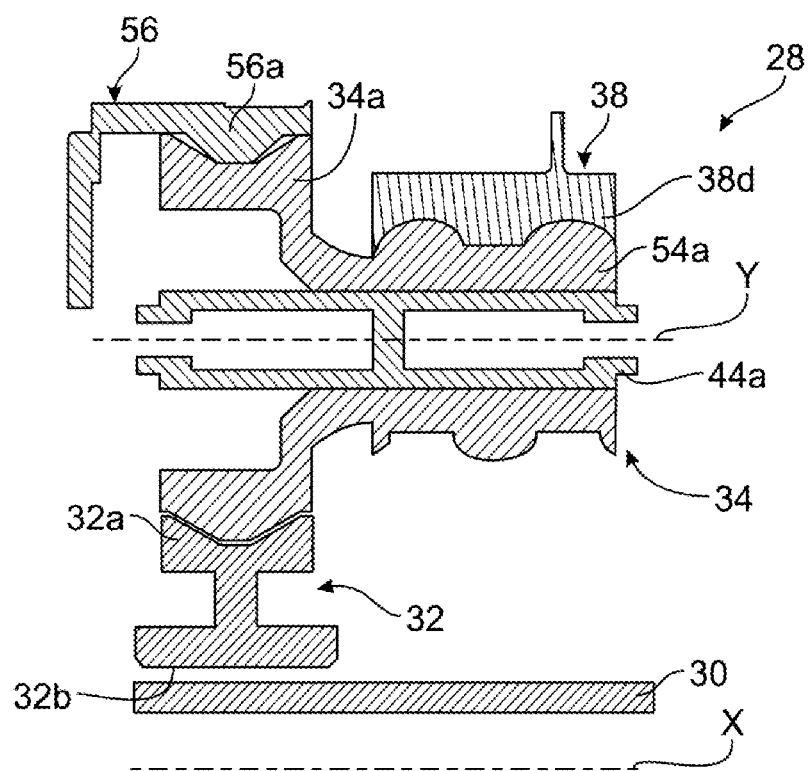
FIG. 9 is a partial schematic view of a reduction gear in axial section according to the embodiment in FIG. 8.

FIG. 9 provides a partial schematic view of the reduction gear 28 shown in FIG. 8.

The reference 30 refers to the shaft, one end of which comprises splines complementary to the splines 32b of the sun gear 32. FIG. 9 shows that the planet gears 34 are arranged around the shaft 30 or part of the shaft. In some embodiments, this is the case when the stationary ring gear 38 is located downstream of the movable ring gear 56. As the shaft 30 comes from downstream of the electric motor, it is coupled to the upstream toothing 34a of the planet gears 34 and the toothing 54a of these planet gears are located around the shaft 30.

Figure 10:
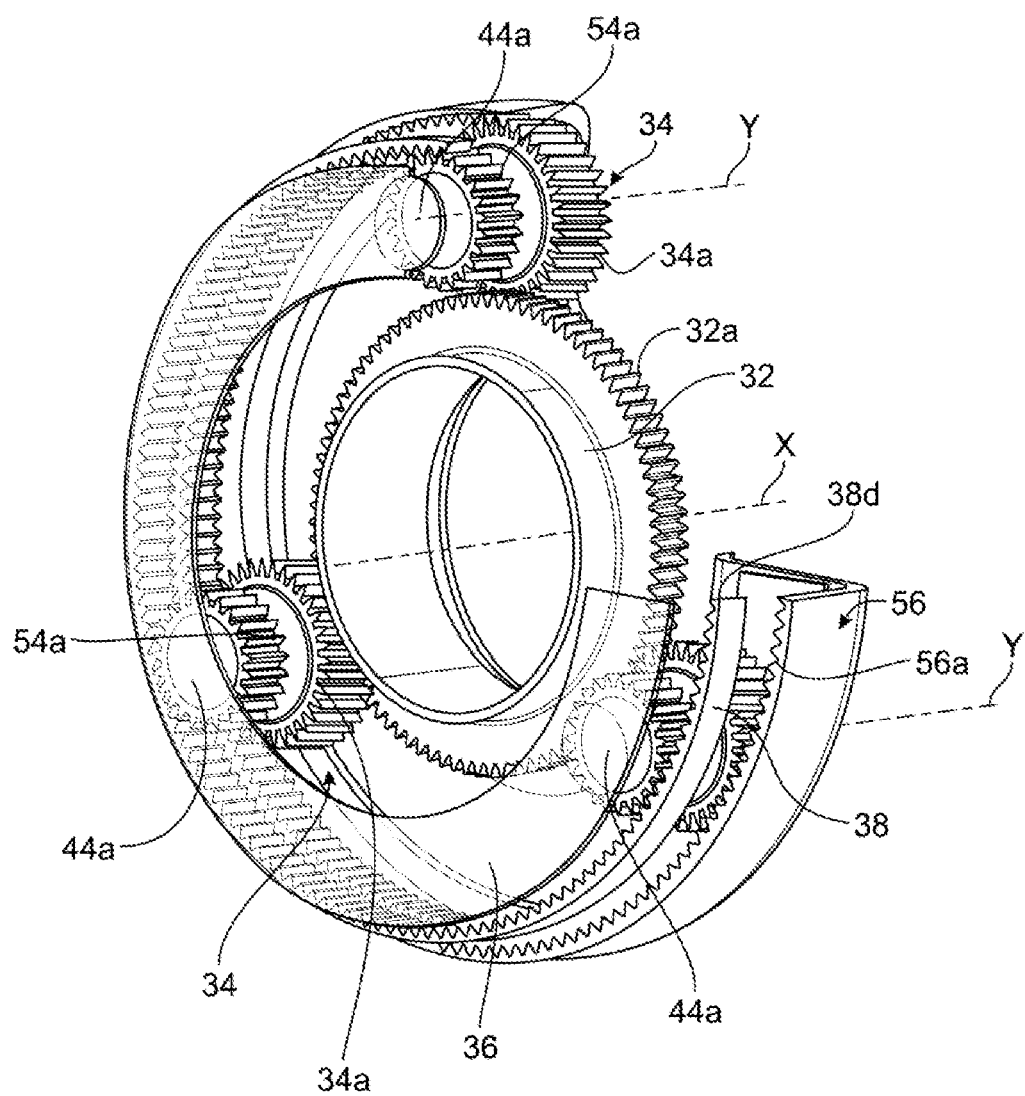
FIG. 10 is a partial schematic perspective view of a reduction gear according to the embodiment in FIG. 8.
Figure 11:
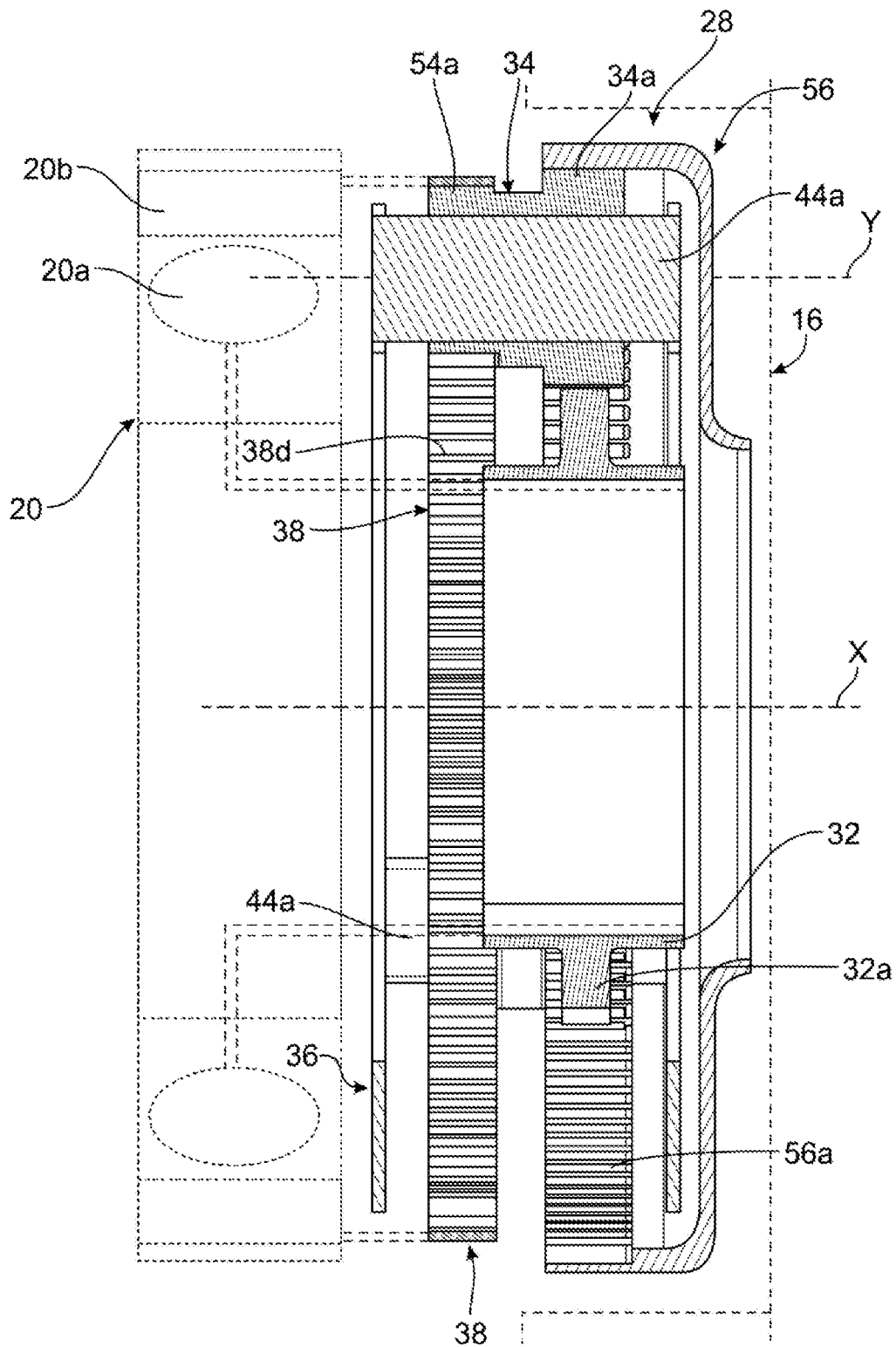
FIG. 11 is a partial schematic view of the reduction gear in axial section according to the embodiment in FIG. 8.

FIGS. 10 and 11 also provide partial illustrations of the reduction gear 28 shown in FIG. 8.

The reference 36 refers to the planet carrier which carries the cylindrical bodies 44a of the hydrodynamic bearings of the planet gears 34.

In the embodiments shown in FIGS. 8-11, D1 is less than D2. The number of planet gears 34 in the reduction gear shown in FIGS. 10 and 11 is three.

FIG. 11 also shows the position of the motor 20 (shown in dotted lines) next to reduction gear 28. The motor 20 is annular in shape and is positioned next to the planet gears 34. The planet gears 34 and the motor 20 are therefore located on circumferences of the same or close diameter. The references 20a and 20b refer respectively to the rotor and the stator of the motor 20, both of which are annular. The stator 20b is connected to the stationary ring gear 38 and the rotor 20a is connected to the sun gear 32.

The rim 16 is shown in dotted lines and the reduction gear 28 is at least partly housed axially in the rim 16.

Figure 12:
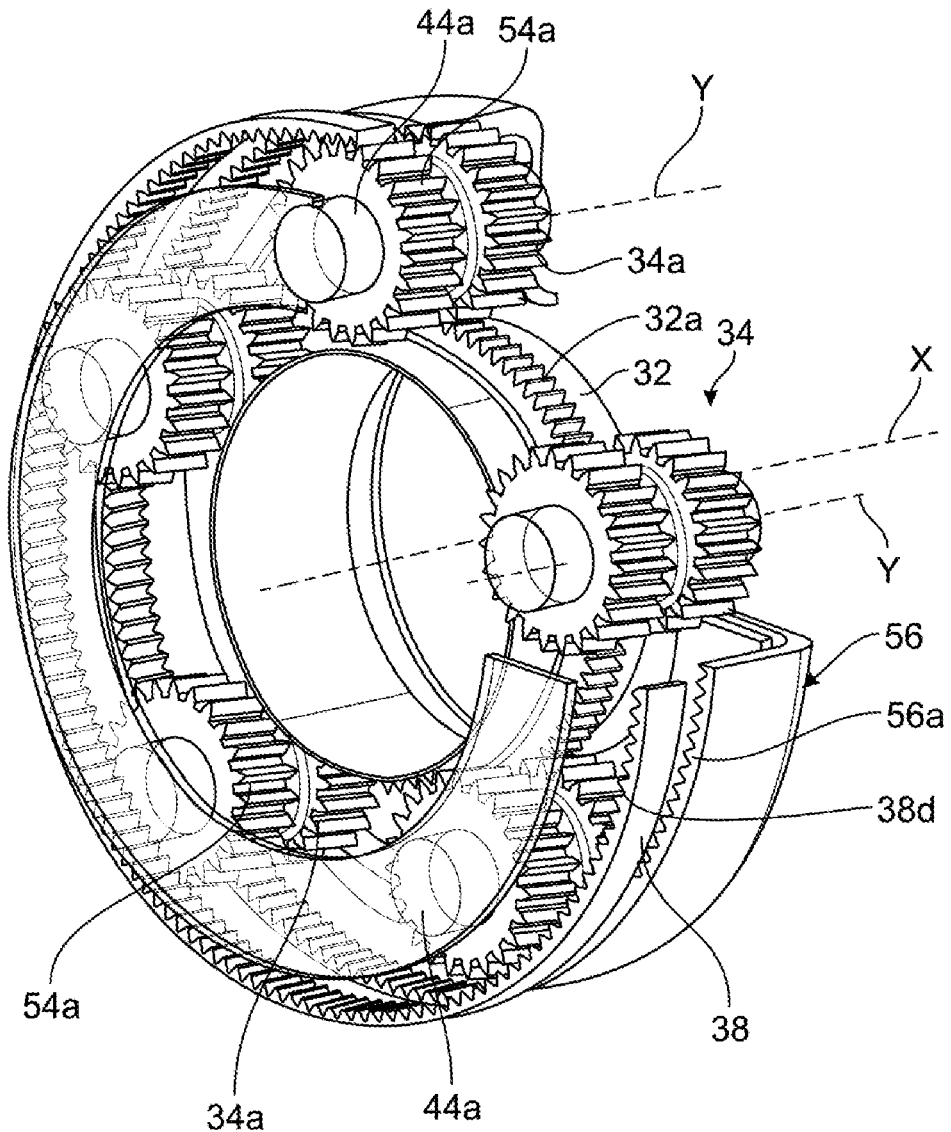
FIG. 12 is a partial schematic perspective view of an alternative embodiment of the reduction gear.

In the alternative embodiment shown in FIG. 12, the diameters of the toothings 34a, 54a of the planet gears 34 are different and the number of planet gears 34 is five.

Figure 13:
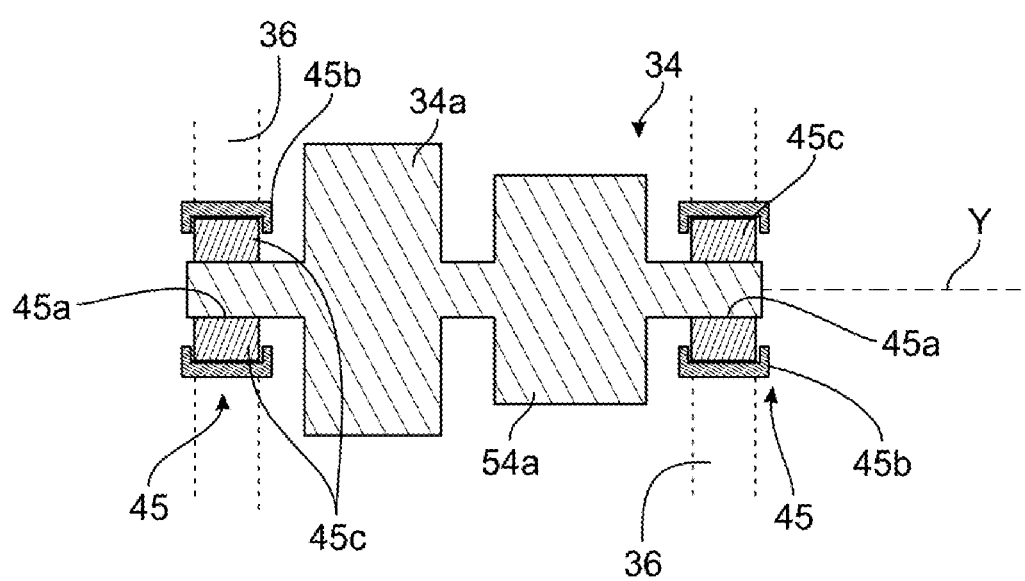
FIG. 13 is a schematic axial sectional view of a planet gear and guide bearings for guiding this planet gear in accordance with embodiments of the present disclosure.

FIG. 13 shows another example of how the planet gears 34 of the reduction gear 28 are guided. The planet gears 34 are guided by rolling bearings 45, which in this case are roller bearings. There are two guide bearings 45 for guiding each planet gear 34, mounted around the longitudinal ends of this planet gear, between these ends and the planet carrier 36. Each of the bearings 45 comprises an internal ring 45a carried by the planet gear 34 or integrated into it, and an external ring 45b carried by the planet carrier 36. The rollers 45c are mounted between the rings 45a, 45b.

FIG. 13 shows that the toothings 34a, 54a of the planet gears are located between the bearings 45. This arrangement allows the moments applied to the planet gears 34 by the meshing to be balanced as effectively as possible.

Figure 14:
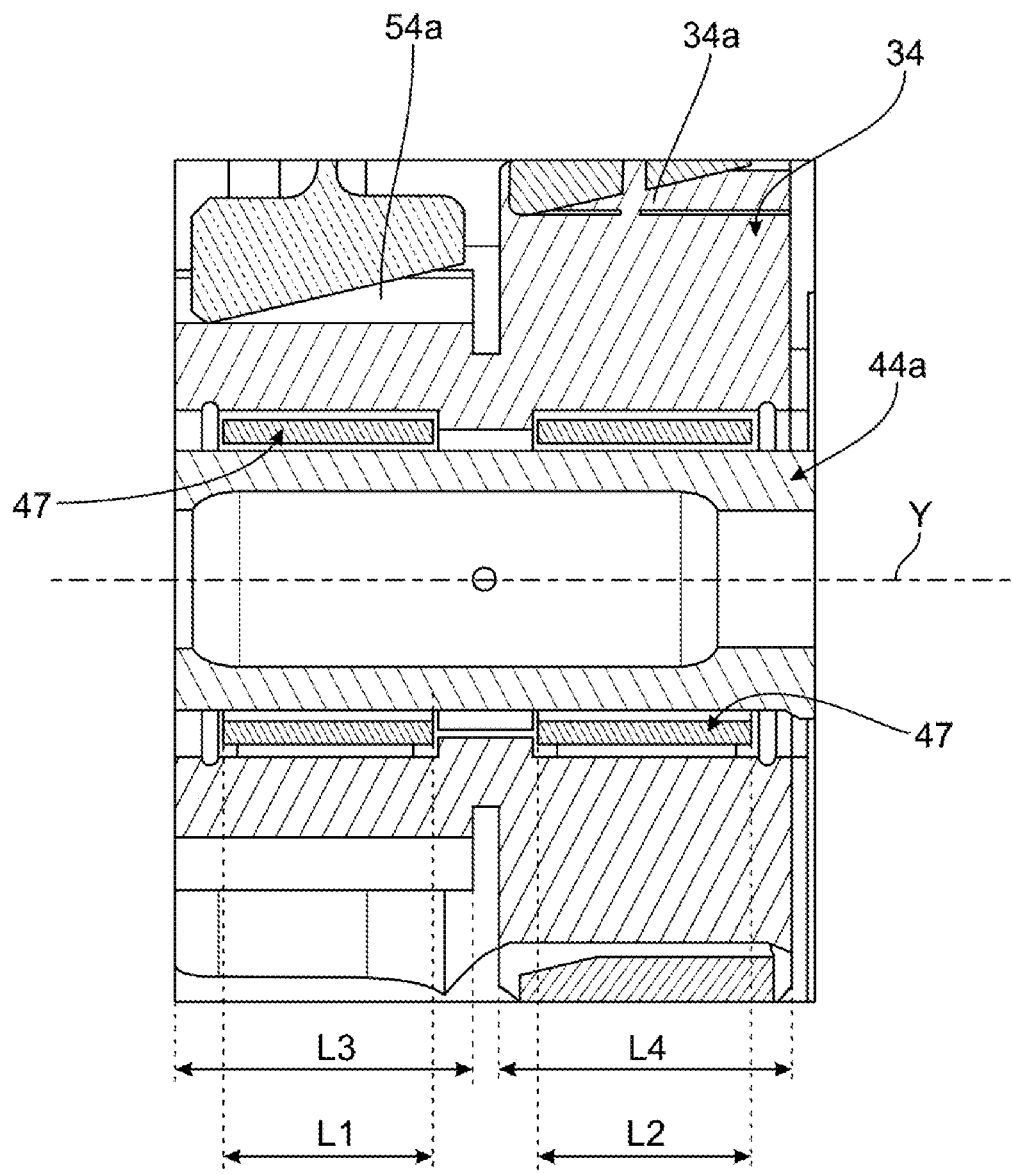
FIG. 14 is a schematic axial sectional view of a planet gear and guide bearings for guiding this planet gear in accordance with embodiments of the present disclosure.

Alternatively, as shown in FIG. 14, the planet gears 34 are guided by needle bearings 47. These bearings 47 are two in number and are mounted radially between the planet gears 34 and the bodies 44a. Each of the bearings 47 is radially aligned with one of the toothing 34a, 54a of the planet gear 34. This assembly allows to reduce the axial overall dimension.

Each of the bearings 47 may have an axial length or dimension L1, L2 measured along the axis Y, which is at least 80% of the axial length or dimension L3, L4 of the corresponding toothing 34a, 54a.

In the foregoing description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 10% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

It should be noted that for purposes of this disclosure, terminology such as "upper," "lower," "vertical," "horizontal," "fore," "aft," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A device for driving at least one wheel of an aircraft landing gear, the device comprising:
    at least one landing gear wheel including a rim having an axis of rotation;
    an electric motor including a shaft; and
    a mechanical transmission system for mechanical transmission between the shaft of the motor and the rim, the mechanical transmission system including a mechanical reduction gear, the mechanical reduction gear comprising:
    a sun gear secured in rotation to the shaft of the motor, the sun gear being centered on the axis of rotation and having an external toothing;
    a stationary ring gear centered on the axis of rotation and having an internal toothing, the stationary ring gear being configured to be secured to a stator of the device;
    a movable ring gear centered on the axis of rotation and having an internal toothing, the movable ring gear being secured in rotation to the rim; and
    planet gears which are meshed with the sun gear, the planet gears being carried by a planet carrier which is mobile in rotation about the axis of rotation, each of the planet gears having two external toothings meshed respectively with the toothing of the stationary and movable ring gears,
    wherein the toothing of the stationary and movable ring gears have the same diameter.

2. The device of claim 1, wherein the planet gears are each centered and guided by:
    two roller bearings carried by the planet carrier, wherein the toothing of each of the planet gears is located between these roller bearings; or
    two needle bearings carried by the planet carrier, wherein each of the needle bearings is radially aligned with one of the toothing of the planet gear.

3. The device of claim 1, wherein the toothing of the stationary and movable ring gears have different numbers of teeth.

4. The device of claim 1, wherein all the toothings are selected from straight, helical, or herringbone toothings.

5. The device of claim 1, wherein the motor has an annular shape centered on the axis of rotation and arranged next to the reduction gear.

6. The device claim 1, wherein the motor is arranged aside the planet gears along the axis of rotation.

7. The device of claim 1, wherein:
    the two external toothings of each of the planet gears comprise a first external toothing having a smallest diameter and a second external toothing having a greatest diameter which is different from the smallest diameter;
    the first external toothing having the smallest diameter meshing with the toothing of the stationary ring gear; and
    the second external toothing having the greatest diameter meshing with the toothing of the movable ring gear.

8. The device of claim 1, wherein the electric motor is arranged on the side of the stationary ring gear and on the opposite side to the movable ring gear.

9. The device of claim 1, wherein the planet carrier is arranged on the side of the electric motor.

10. The device of claim 1, wherein each of the planet gears is meshed by a first toothing with the toothing of the sun gear and the toothing of the stationary ring gear, and by a second toothing with the toothing of the movable ring gear.

11. The device of claim 1, wherein each of the planet gears is meshed by a first toothing with the toothing of the sun gear and the toothing of the movable ring gear, and by a second toothing with the toothing of the stationary ring gear.

12. The device of claim 1, wherein the planet gears are arranged around at least part of the shaft of the motor.

* * * * *